(12) United States Patent
Kuroumaru

(10) Patent No.: US 8,550,205 B2
(45) Date of Patent: Oct. 8, 2013

(54) ELECTRIC POWER STEERING SYSTEM

(75) Inventor: Yoshikazu Kuroumaru, Kashihara (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/555,509

(22) Filed: Jul. 23, 2012

(65) Prior Publication Data

US 2013/0048412 A1  Feb. 28, 2013

(30) Foreign Application Priority Data

Aug. 30, 2011  (JP) .................................. 2011-186976

(51) Int. Cl.
 *B62D 5/04* (2006.01)
(52) U.S. Cl.
 USPC .......... 180/444; 180/443; 180/446; 310/68 B; 310/68 R
(58) Field of Classification Search
 USPC .......................................... 180/443, 444, 446
 See application file for complete search history.

(56) References Cited

U.S. PATENT DOCUMENTS

2006/0096801 A1 * 5/2006 Fujita ........................... 180/443

FOREIGN PATENT DOCUMENTS

| EP | 2 006 185 A2 | 12/2008 |
| JP | A-2004-130890 | 4/2004 |

OTHER PUBLICATIONS

Jun. 18, 2013 Search Report issued in European Patent Application No. 12178439.1.

* cited by examiner

*Primary Examiner* — J. Allen Shriver, II
*Assistant Examiner* — Conan Duda
(74) *Attorney, Agent, or Firm* — Oliff & Berridge, PLC

(57) ABSTRACT

A torque sensor and an electric motor are supported by a steering column by which a steering shaft is rotatably supported. On a control board on which a control circuit that controls driving of an electric motor is mounted, a first terminal group and a second terminal group that are selectively connected to the torque sensor are respectively provided at a first end portion and a second end portion in a first direction parallel to a central axis of the steering shaft. A third terminal group that is connectable to the electric motor is provided at one end portion (third end portion) in a second direction perpendicular to the first direction.

5 Claims, 5 Drawing Sheets

ELECTRIC POWER STEERING SYSTEM

INCORPORATION BY REFERENCE/RELATED APPLICATION

This application claims priority to Japanese Patent Application No. 2011-186976 filed on Aug. 30, 2011 the disclosure of which, including the specification, drawings and abstract, is incorporated herein by reference in its entirety.

BACKGROUND OF THE INVENTION

1. Field of the Invention
The invention relates to an electric power steering system.
2. Discussion of Background
In some electric power steering systems, the mounting position of a motor that generates steering assist force varies depending on whether the electric power steering system is used for a left side steering wheel vehicle or for a right side steering wheel vehicle. Japanese Patent Application Publication No. 2004-130890 (JP 2004-130890 A) describes that a first connection portion to which an electric motor applied to a left-side steering wheel vehicle is connected and a second connection portion to which an electric motor applied to a right-side steering wheel vehicle is connected are formed in a control board.

However, because the first connection portion and the second connection portion in JP 2004-130890 A are used to supply electric power to the electric motor, the first connection portion and the second connection portion tend to be large in size. As a result, the size of the control board increases, which causes an increase in the size of the electric power steering system.

SUMMARY OF THE INVENTION

The invention provides a compact electric power steering system in which a single control board is used irrespective of a change in the mounting position of an electric motor.

According to a feature of an example of the invention, a single connection portion group to which an electric motor is connected and two connection portion groups to which a torque sensor is connected are provided. With this configuration, irrespective of a change in the mounting position of the electric motor, it is possible to use the same control board.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
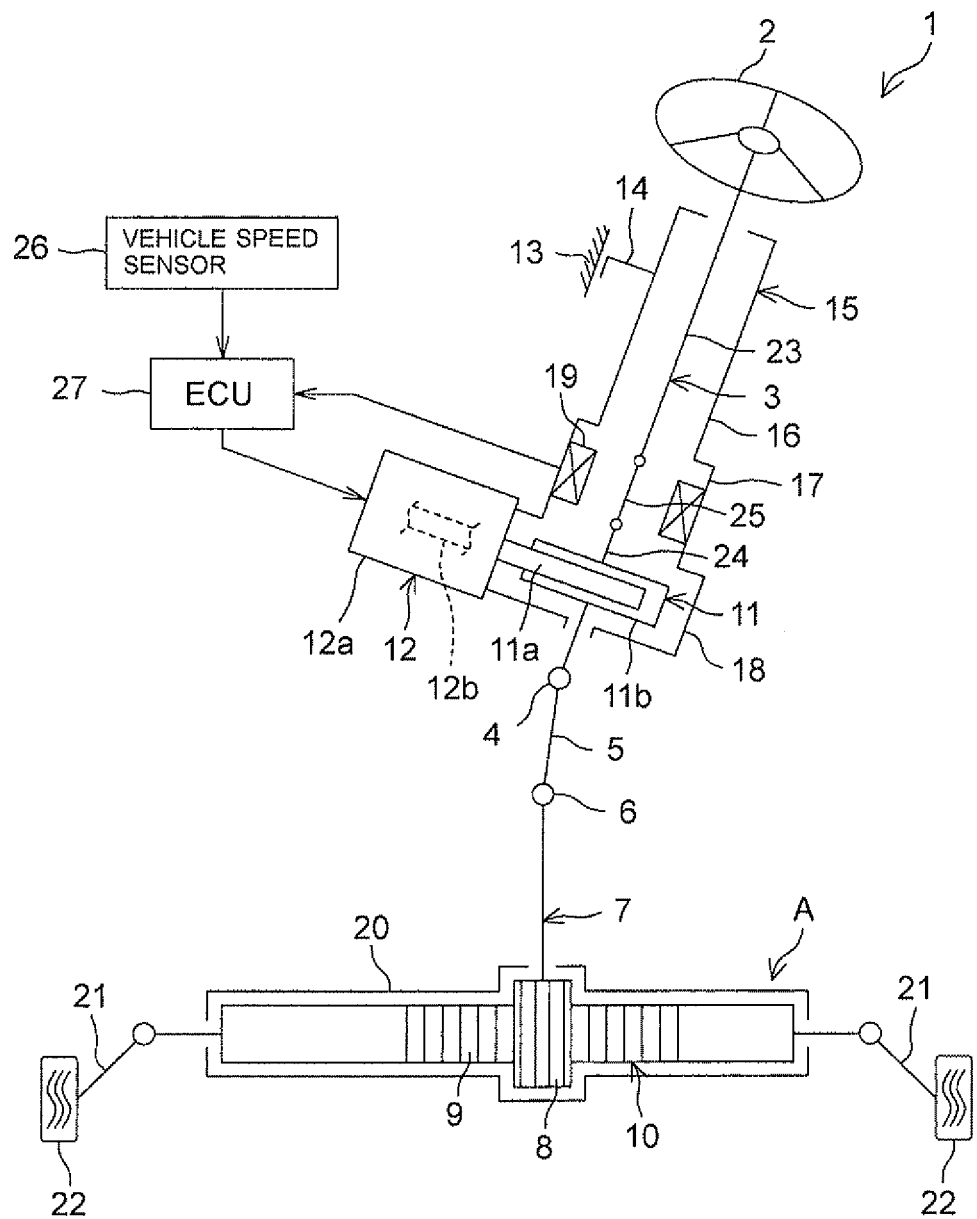
FIG. 1 is a schematic view that shows the schematic configuration of an electric power steering system according to an embodiment of the invention.

FIG. 1 is a schematic view that shows the schematic configuration of an electric power steering system 1 according to an embodiment of the invention. The electric power steering system 1 includes a steering shaft 3, an intermediate shaft 5, a pinion shaft 7, a rack shaft 10, and an electric motor 12. The steering shaft 3 may function as a steering transmission shaft, and a steering wheel 2 is coupled to one end of the steering shaft 3. The intermediate shaft 5 is coupled to the steering shaft 3 via a universal joint 4. The pinion shaft 7 is coupled to the intermediate shaft 5 via a universal joint 6. The rack shaft 10 has a rack 9, and extends in the lateral direction of a vehicle. The rack 9 is in mesh with a pinion 8 provided at the distal end portion of the pinion shaft 7. The electric motor 12 supplies steering assist force to the steering shaft 3 via a speed reduction mechanism 11 that may function as a transmission mechanism.

The electric power steering system 1 in the present embodiment is a so-called column assist-type electric power steering system in which the electric motor 12 assists a steering of the steering shaft 3 that may function as the steering transmission shaft. However, the invention may be applied to a so-called pinion assist-type electric power steering system in which the electric motor 12 assists steering of the pinion shaft 7 that may function as the steering transmission shaft or a so-called rack assist-type electric power steering system in which the electric motor 12 assists steering of the rack shaft 10 that may function as the steering transmission shaft.

The steering shaft 3 is passed through a steering column 15, and is rotatably supported by the steering column 15. The steering column 15 may function as an outer frame that is fixed to a vehicle body 13 via a bracket 14. The steering column 15 that may function as the outer frame includes a column tube 16, a first housing 17 (which corresponds to a sensor housing) and a second housing 18 (which corresponds to a gear housing). The first housing 17 is coupled to the axially lower end of the column tube 16. The second housing 18 is coupled to the axially lower end of the first housing 17.

A torque sensor 19 is accommodated in the first housing 17. The torque sensor 19 is used to detect a steering torque that is applied to the steering wheel 2. The speed reduction mechanism 11 is accommodated in the second housing 18.

The rack shaft 10 is supported by a tubular rack housing 20 so as to be movable in the axial direction. Tie rods 21 are coupled to respective end portions of the rack shaft 10. The tie rods 21 are coupled to respective steered wheels 22 via knuckle arms (not shown). The pinion shaft 7, the rack shaft 10, the tie rods 21, and the like, constitute a steering mechanism A that is used to steer the steered wheels 22.

When the steering wheel 2 is operated to rotate the steering shaft 3, the rotation of the steering shaft 3 is transmitted to the pinion 8 via the intermediate shaft 5, and the like, and is converted to a linear motion of the rack shaft 10 in the lateral direction of the vehicle by the pinion 8 and the rack 9. In this way, the steered wheels 22 are steered.

The steering shaft 3 includes a first steering shaft 23 and a second steering shaft 24. The first steering shaft 23 serves as a first shaft that is connected to the steering wheel 2. The second steering shaft 24 serves as a second shaft that is connected to the universal joint 4. The first steering shaft 23 and the second steering shaft 24 are coaxially coupled to each other via a torsion bar 25 that serves as a coupling shaft. Torque is transmittable between the first steering shaft 23 and the second steering shaft 24. The first steering shaft 23 and the second steering shaft 24 are rotatable relative to each other within a predetermined range.

The electric motor 12 includes a motor housing 12a, an output shaft 12b, a stator (not shown), and a rotor (not shown).

The motor housing 12a is securely fitted to the second housing 18 of the steering column 15. The output shaft 12b is rotatably supported by the motor housing 12a. The stator is fixed inside the motor housing 12a. The rotor is coupled to the output shaft 12b so as to be rotatable together with the output shaft 12b.

The speed reduction mechanism 11 includes a drive gear 11a and a driven gear 11b. The drive gear 11a is formed of a worm gear, and is coupled to the output shaft 12b of the electric motor 12 such that torque is transmittable between the drive gear 11a and the output shaft 12b. The driven gear 11b is formed of a worm wheel. The driven gear 11b is in mesh with the drive gear 11a, and is coupled to the second steering shaft 24 so as to be rotatable together with the second steering shaft 24.

The electric power steering system 1 includes an electronic control unit (ECU) 27. The ECU 27 includes a microcomputer that executes drive control over the electric motor 12 on the basis of a steering torque that is detected by the torque sensor 19 and a vehicle speed that is detected by a vehicle speed sensor 26.

The torque sensor 19 detects a steering torque that is applied to the first steering shaft 23 and the second steering shaft 24, on the basis of a change in magnetic flux based on a relative rotation displacement between the first steering shaft 23 and the second steering shaft 24 due to a torsion of the torsion bar 25. The ECU 27 determines a target assist amount with the use of a map that stores the correlation between a steering torque and a target assist amount for each vehicle speed, and executes control so that assist force generated by the electric motor 12 approaches the target assist amount.

When the ECU 27 drives the electric motor 12, the speed of rotation output from the electric motor 12 is reduced by the speed reduction mechanism 11 that includes the drive gear 11a and the driven gear 11b, and the rotation with a reduced speed is transmitted to the second steering shaft 24. The power transmitted to the second steering shaft 24 is further transmitted to the steering mechanism A that includes the pinion shaft 7, the rack shaft 10, the tie rods 21 and the knuckle arms, via the intermediate shaft 5, and the like, to assist a driver's steering operation.

Figure 2:
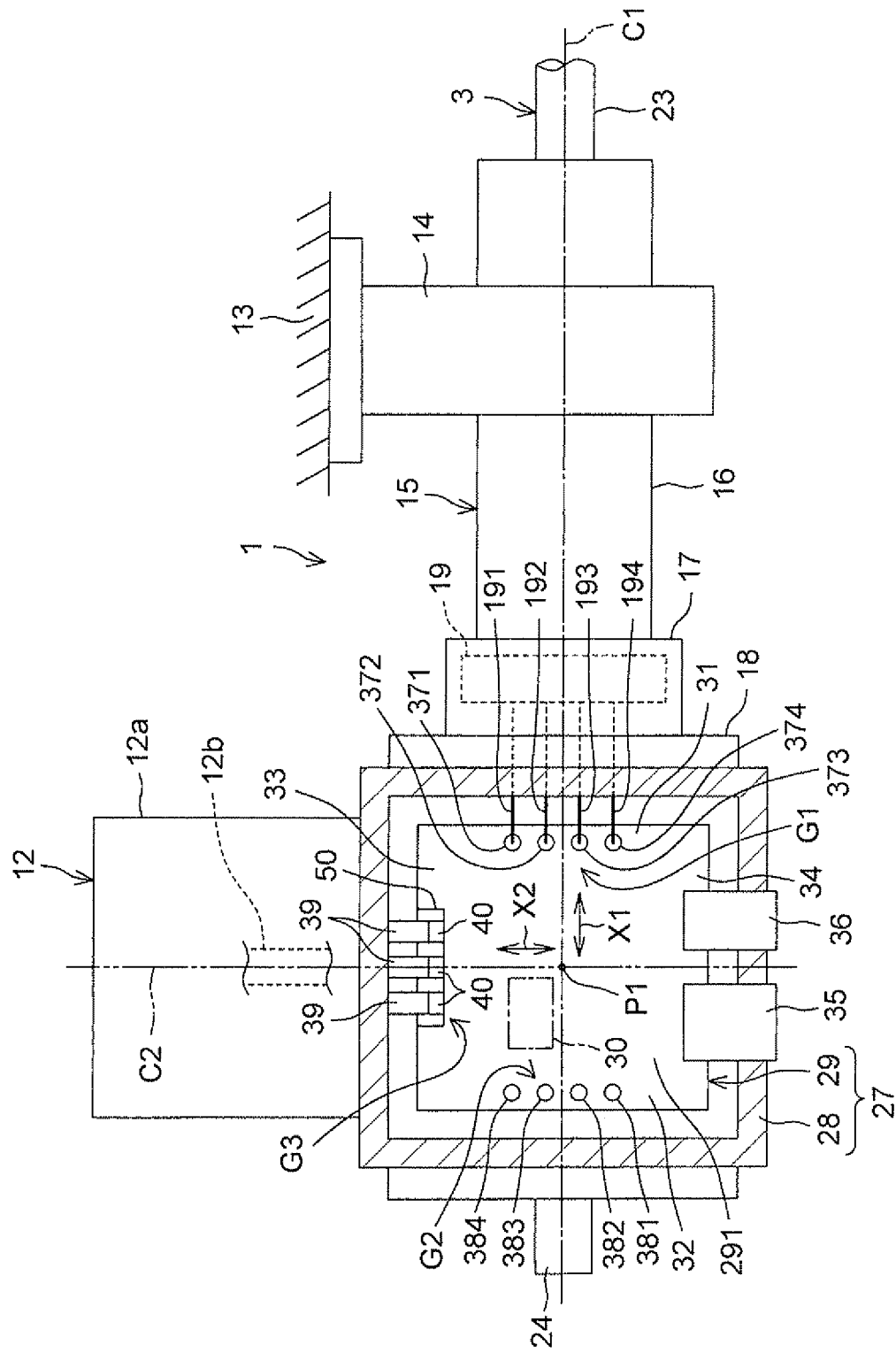
FIG. 2 is a side view of the electric power steering system, showing the schematic configuration when an electric motor is fitted to the left side of a steering column.

FIG. 2 is a side view of the electric power steering system 1, showing the schematic configuration when the electric motor 12 is fitted to the left side of the steering column 15. The ECU 27 includes an ECU box 28 and a control board 29. The ECU box 28 is securely fitted to the second housing 18. The control board 29 is accommodated in the ECU box 28. A control circuit 30 is mounted on the control board 29. The control circuit 30 executes drive control over the electric motor 12 on the basis of signals from the torque sensor 19 and the vehicle speed sensor 26.

The control board 29 has a first end portion 31 and a second end portion 32 that are a pair of end portions in a first direction X1 parallel to a central axis C1 of the steering shaft 3. In addition, the control board 29 has a third end portion 33 and a fourth end portion 34 that are a pair of end portions in a second direction X2 perpendicular to the first direction X1.

A first terminal group G1 is provided at the first end portion 31 that is one end portion in the first direction X1. The first terminal group G1 may function as a first connection portion group that is connectable to the torque sensor 19. A second terminal group G2 is provided at the second end portion 32 that is the other end portion in the first direction X1. The second terminal group G2 may function as a second connection portion group that is connectable to the torque sensor 19.

A third terminal group G3 is provided at the third end portion 33 that is one end portion in the second direction X2.

The third terminal group G3 may function as a third connection portion group that is connectable to the electric motor 12. A power input connector 35 and a vehicle signal input connector 36 are arranged at the fourth end portion 34 that is the other end portion in the second direction X2. The power input connector 35 may function as a power input connection portion that receives power from an in-vehicle battery. The vehicle signal input connector 36 may function as a vehicle signal input connection portion that receives a vehicle signal, such as a signal from the vehicle speed sensor 26.

The first terminal group G1 that may function as the first connection portion group is formed of first terminals 371 to 374 that may function as a plurality of first connection portions. The first terminals 371 to 374 are connectable to corresponding output terminals 191 to 194 from the torque sensor 19. The second terminal group G2 that may function as the second connection portion group is formed of second terminals 381 to 384 that may function as a plurality of second connection portions. The second terminals 381 to 384 are connectable to the corresponding output terminals 191 to 194 from the torque sensor 19. For example, the first terminals 371 to 374 and the second terminals 381 to 384 are formed of through-holes, and the output terminals 191 to 194 from the torque sensor 19 are formed of pin terminals that are passed through the through-holes and soldered.

When the control board 29 is viewed from a direction perpendicular to the surface of the control board 29 (direction perpendicular to the sheet on which FIG. 2 is drawn), the first terminals 371 to 374 that constitute the first terminal group G1 and the second terminals 381 to 384 that constitute the second terminal group G2 are arranged so as to be symmetric with respect to an intersection point P1 of the central axis C1 of the steering shaft 3 and the central axis C2 of the output shaft 12b of the electric motor 12.

The third terminal group G3 that may function as the third connection portion group is formed such that third terminals 40 that serve as a plurality of third connection portions that are respectively connected to a plurality of power supply bus bar terminals 39 (corresponding to U, V and W phases, for example) from the electric motor 12 are arranged on a terminal base 50. When the electric motor 12 is a brushless motor, the third terminal group G3 may include a rotation angle signal input terminal (not shown) that receives a rotation angle signal from the electric motor 12.

Figure 3:
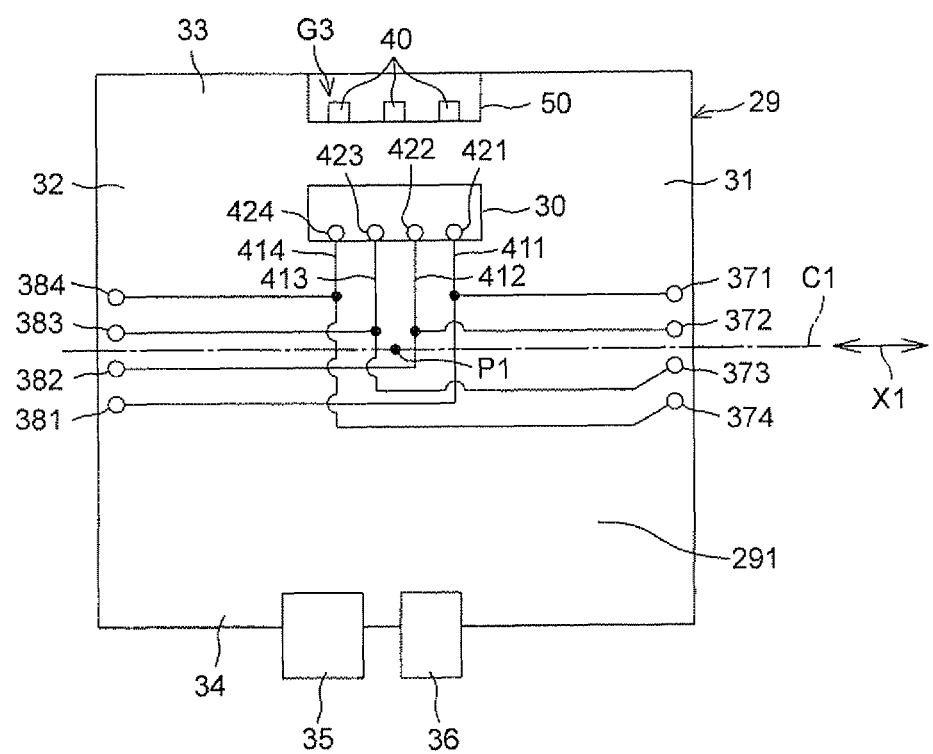
FIG. 3 is a schematic view of a control board.

As shown in FIG. 3, the first terminal 371 and the second terminal 381 that are arranged so as to be symmetric with respect to the intersection point P1 are both connected to a first input portion 421 of the control circuit 30 via a line 411 provided on the control board 29. The first terminal 372 and the second terminal 382 that are arranged so as to be symmetric with respect to the intersection point P1 are both connected to a second input portion 422 of the control circuit 30 via a line 412 provided on the control board 29.

In addition, the first terminal 373 and the second terminal 383 that are arranged so as to be symmetric with respect to the intersection point P1 are both connected to a third input portion 423 via a line 413. The first terminal 374 and the second terminal 384 that are arranged so as to be symmetric with respect to the intersection point P1 are both connected to a fourth input portion 424 via a line 414.

Figure 4:
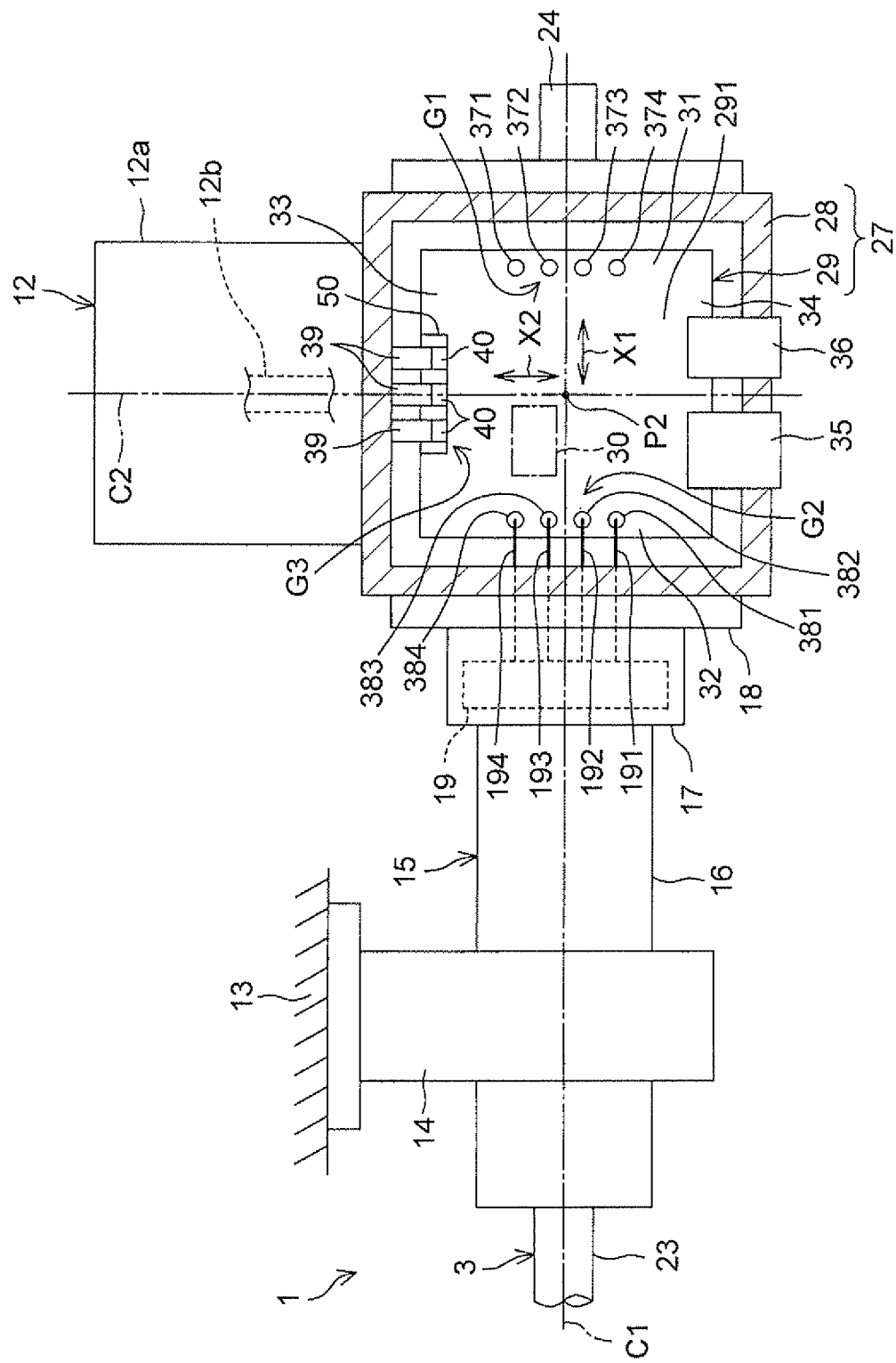
FIG. 4 is a side view of the electric power steering system, showing the schematic configuration when the electric motor is fitted to the right side of the steering column.

FIG. 4 is a side view of the electric power steering system 1, showing the schematic configuration when the electric motor 12 is fitted to the right side of the steering column 15.

In the case shown in FIG. 2 in which the electric motor 12 is fitted to the left side of the steering column 15, the first terminal group G1 that may function as the first connection portion group is arranged on the torque sensor 19 side and is connected to the torque sensor 19; whereas, in the case shown in FIG. 4 in which the electric motor 12 is fitted to the right side of the steering column 15, the second terminal group G2 that may function as the second connection portion group is arranged on the torque sensor 19 side and is connected to the torque sensor 19. In both the case in FIG. 2 and the case in FIG. 4, the same control board 29 is used. The other configuration is the same as that in FIG. 2.

According to the present embodiment, the orientation of the control board 29 in the case where the electric motor 12 is arranged on the left side of the central axis C1 of the steering shaft 3 is different by 180° from the orientation of the control board 29 in the case where the electric motor 12 is arranged on the right side of the central axis C1 of the steering shaft 3. In both of the cases, the third terminal group G3 faces the electric motor 12. The control board 29 arranged in this way is connected to the ECU box 28 fixed to the second housing 18 of the steering column 15.

Even if the orientation of the control board 29 is changed, one of the first terminal group G1 and the second terminal group G2 faces the torque sensor 19. Therefore, the one of the terminal groups G1 and G2 is connected to the torque sensor 19. In this way, irrespective of a change in the mounting position of the electric motor 12, it is possible to use the same control board 29. The number of third terminal group G3 (terminal base 50), to which the electric motor 12 is connected and which tends to be large in size, is one. In addition, the two connection portion groups (the first terminal group G1 and the second terminal group G2), to which the torque sensor 19 is connected and which are less likely to be increased in size, are provided. As a result, it is possible to reduce the size of the control board 29.

In addition, irrespective of a change in the mounting position of the electric motor 12, the power input connector 35 and the vehicle signal input connector 36 are arranged on the opposite side of the control board 19 from the electric motor 12. Therefore, it is possible to achieve a layout with high space efficiency.

In addition, when the control board 29 is viewed from the direction perpendicular to the surface of the control board 29 as shown in FIG. 2, the first terminals 371 to 374 that constitute the first terminal group G1 and the second terminals 381 to 384 that constitute the second terminal group G2 are arranged so as to be symmetric with respect to the intersection point P1 of the central axis C1 of the steering shaft 3 and the central axis C2 of the output shaft 12b of the electric motor 12. With this configuration, one of the first terminal group G1 and the second terminal group G2, which faces the torque sensor 19 when the orientation of the control board 29 is changed in response to a change in the mounting position of the electric motor 12, is connected to the torque sensor 19. That is, irrespective of a change in the mounting position of the electric motor 12, it is possible to use the same control board 29.

In addition, the first terminals 371 to 374 and the corresponding second terminals 381 to 384 are connected to the corresponding input portions 421 to 424 of the control circuit 30 via the corresponding lines 411 to 414 provided on the control board 29. Therefore, regardless of whether the torque sensor 19 is connected to the first terminal group G1 or to the second terminal group G2, it is possible to transmit signals from the connected terminal group to the control circuit 30.

Figure 5:
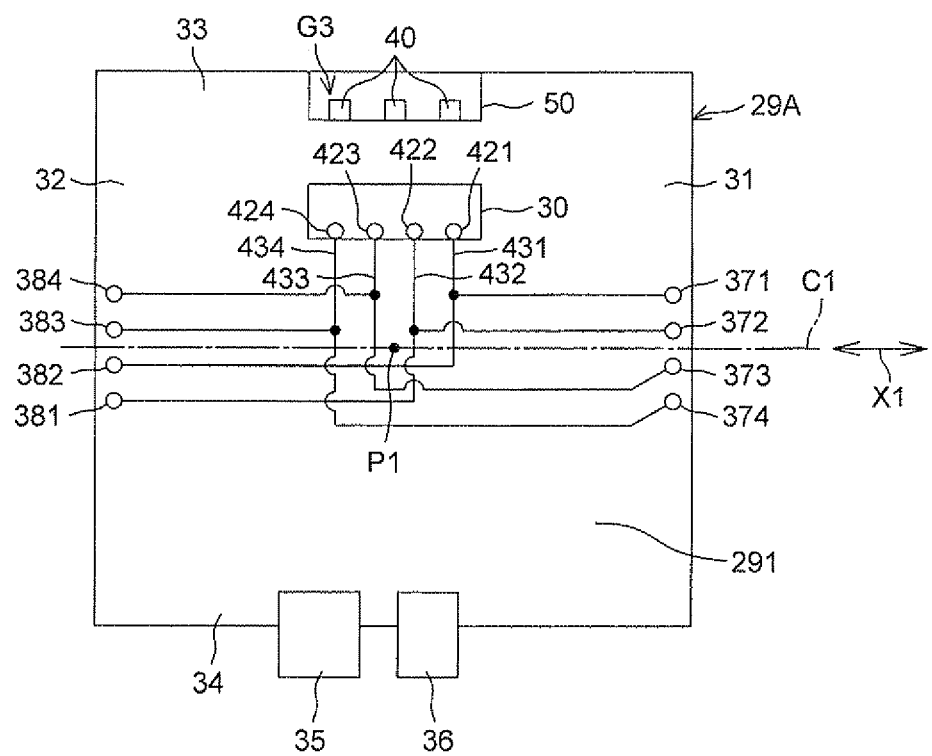
FIG. 5 is a schematic view of a control board according to another embodiment of the invention.

FIG. 5 shows a control board 29A according to another embodiment of the invention. The present embodiment differs from the embodiment shown in FIG. 3 in the following point. The torque sensor 19 is formed of, for example, a Hall IC, and a pair of output terminals 191, 192 of the torque sensor 19 is configured to output signals having the same absolute value and opposite in sign to each other. Similarly, a pair of output terminals 193, 194 is also configured to output signals having the same absolute value and opposite in sign to each other.

The first terminal 371 that is connectable to the output terminal 191 in the state in FIG. 2 and the second terminal 382 that is connectable to the output terminal 192 in the state in FIG. 4 are both connected to the first input portion 421 of the control circuit 30 via a line 431 provided on the control board 29A.

In addition, the first terminal 372 that is connectable to the output terminal 192 in the state in FIG. 2 and the second terminal 381 that is connectable to the output terminal 191 in the state in FIG. 4 are both connected to the second input portion 422 of the control circuit 30 via a line 432 provided on the control board 29A.

The first terminal 373 that is connectable to the output terminal 193 in the state in FIG. 2 and the second terminal 384 that is connectable to the output terminal 194 in the state in FIG. 4 are both connected to the third input portion 423 of the control circuit 30 via a line 433 provided on the control board 29A.

In addition, the first terminal 374 that is connectable to the output terminal 194 in the state in FIG. 2 and the second terminal 383 that is connectable to the output terminal 193 in the state in FIG. 4 are both connected to the fourth input portion 424 of the control circuit 30 via a line 434 provided on the control board 29A.

According to the present embodiment, when the torque sensor 19 is connected to the first terminal group G1, the first terminal 371 and the first terminal 372 are respectively connected to the first input portion 421 and the second input portion 422; whereas, when the torque sensor 19 is connected to the second terminal group G2, the second terminal 381 and the second terminal 382 are respectively connected to the second input portion 422 and the first input portion 421.

In addition, when the torque sensor 19 is connected to the first terminal group G1, the first terminal 373 and the first terminal 374 are respectively connected to the third input portion 423 and the fourth input portion 424; whereas, when the torque sensor 19 is connected to the second terminal group G2, the second terminal 383 and the second terminal 384 are respectively connected to the fourth input portion 424 and the third input portion 423.

In this way, between the case where the torque sensor 19 is connected to the first terminal group G1 and the case where the torque sensor 19 is connected to the second terminal group G2, for example, the input portion of the control circuit 30, which is connected to a corresponding one of the first terminal 371 and the second terminal 381 that are arranged so as to be symmetric with respect to an intersection point P1, is switched between the first input portion 421 and the second input portion 422, and the input portion of the control circuit 30, which is connected to a corresponding one of the first terminal 372 and the second terminal 382 that are arranged so as to be symmetric to each other, is switched between the second input portion 422 and the first input portion 421. Thus, the signs of signals that are input from the torque sensor 19 to the control circuit 30 are inverted, so it is possible to generate steering assist force by rotating the electric motor 12 in opposite directions. Thus, irrespective of a change in the mounting position of the electric motor 12, it is possible to commonalize a program configuration of the control circuit 30.

The invention is not limited to the above embodiments. For example, a brushless motor may be used as the electric motor 12. In addition, in the above embodiments, the number of the first terminals that may function as the first connection portions is four, the number of the second terminals that may function as the second connection portions is four, and the number of the third terminals that may function as the third connection portions is three; however, the invention is not limited to this configuration. The numbers of the terminals that may function as the respective connection portions may be variously changed on the basis of an electric motor used, or the like. Other than the above, various modifications may be carried out within the scope of the appended claims of the invention.

What is claimed is:

1. An electric power steering system, comprising:
   an outer frame by which a steering transmission shaft is rotatably supported;
   a torque sensor that is supported by the outer frame, and that detects a steering torque;
   an electric motor that is supported by the outer frame, and that transmits power to the steering transmission shaft via a transmission mechanism; and
   a control board that is fitted to the outer frame, and on which a control circuit that controls driving of the electric motor based on a signal from the torque sensor is mounted, wherein
   the control board has a first connection portion group and a second connection portion group that are respectively arranged at a pair of end portions in a first direction that is parallel to a central axis of the steering transmission shaft and that are selectively connectable to the torque sensor, and has a third connection portion group that is arranged at one end portion in a second direction that is perpendicular to the first direction and that is connectable to the electric motor.

2. The electric power steering system according to claim 1, wherein a power input connection portion and a vehicle signal input connection portion are arranged at the other end portion of the control board in the second direction.

3. The electric power steering system according to claim 1, wherein, when the control board is viewed from a direction perpendicular to a plate face of the control board, a plurality of first connection portions that constitute the first connection portion group and a plurality of second connection portions that constitute the second connection portion group are arranged so as to be symmetric with respect to an intersection point of the central axis of the steering transmission shaft and a central axis of an output shaft of the electric motor.

4. The electric power steering system according to claim 3, wherein each of the first connection portions and a corresponding one of the second connection portions are connected to a common corresponding one of input portions of the control circuit via a corresponding one of lines provided on the control board.

5. The electric power steering system according to claim 4, wherein:
   the torque sensor has at least one pair of output terminals that output signals having the same absolute value and opposite in sign to each other;
   the first connection portion that is connectable to one of the pair of output terminals and the second connection portion that is connectable to the other one of the pair of output terminals are connected to a common corresponding one of the input portions of the control circuit via a corresponding one of the lines provided on the control board; and
   the first connection portion that is connectable to the other one of the pair of output terminals and the second connection portion that is connectable to the one of the pair of output terminals are connected to a common corresponding one of the input portions of the control circuit via a corresponding one of the lines provided on the control board.

* * * * *